United States Patent
Ito

(10) Patent No.: US 7,422,088 B2
(45) Date of Patent: Sep. 9, 2008

(54) BLOCKING DEVICES FOR HOLLOW STRUCTURES

(75) Inventor: Takahisa Ito, Toyota (JP)

(73) Assignees: Kyowa Sangyo Co., Ltd., Toyata-shi, Aichi-ken (JP); Shinwa Seiko Co., Ltd., Toyata-shi, Aichi-ken (JP)

( * ) Notice: Subject to any disclaimer, the term of this patent is extended or adjusted under 35 U.S.C. 154(b) by 549 days.

(21) Appl. No.: 11/152,539

(22) Filed: Jun. 14, 2005

(65) Prior Publication Data

US 2005/0279567 A1 Dec. 22, 2005

(30) Foreign Application Priority Data

Jun. 17, 2004 (JP) ............................. 2004-179703

(51) Int. Cl.
*B29C 33/30* (2006.01)
*B60R 13/00* (2006.01)

(52) U.S. Cl. .............. 181/198; 296/187.02; 296/187.01

(58) Field of Classification Search ................. 181/198; 296/187.02
See application file for complete search history.

(56) References Cited

U.S. PATENT DOCUMENTS

| | | | |
|---|---|---|---|
| 3,822,763 A * | 7/1974 | Adams et al. ................ 181/204 |
| 5,456,516 A * | 10/1995 | Alexander et al. ...... 296/146.14 |
| 5,642,914 A * | 7/1997 | Takabatake ............ 296/187.02 |
| 5,678,826 A * | 10/1997 | Miller ......................... 277/316 |
| 6,135,542 A * | 10/2000 | Emmelmann et al. ....... 296/205 |
| 6,247,287 B1 * | 6/2001 | Takabatake ................. 52/731.6 |
| 6,413,611 B1 * | 7/2002 | Roberts et al. ................ 428/99 |
| 6,419,305 B1 * | 7/2002 | Larsen ................... 296/203.03 |
| 6,649,243 B2 * | 11/2003 | Roberts et al. ................ 428/99 |
| 6,820,923 B1 * | 11/2004 | Bock ...................... 296/187.02 |
| 6,988,585 B2 * | 1/2006 | Mourieras et al. ........... 181/204 |
| 7,077,461 B2 * | 7/2006 | Ratet ..................... 296/187.02 |
| 7,090,273 B2 * | 8/2006 | Stojkovic et al. .............. 296/29 |
| 7,335,413 B2 * | 2/2008 | Ui et al. ...................... 428/100 |
| 2001/0020794 A1 * | 9/2001 | Ishikawa ..................... 296/188 |
| 2003/0010566 A1 * | 1/2003 | Miyakawa et al. .......... 181/204 |
| 2004/0069561 A1 * | 4/2004 | Cox et al. ................... 181/199 |
| 2004/0070232 A1 * | 4/2004 | Mourieras et al. ....... 296/187.02 |
| 2004/0124666 A1 * | 7/2004 | Stahl ..................... 296/187.02 |
| 2004/0175537 A1 * | 9/2004 | Schwatzwalder et al. .... 428/100 |
| 2004/0201258 A1 * | 10/2004 | Daniere et al. ......... 296/203.02 |

(Continued)

FOREIGN PATENT DOCUMENTS

JP 2000102991 A * 4/2000

(Continued)

*Primary Examiner*—Lincoln Donovan
*Assistant Examiner*—Forrest Phillips
(74) *Attorney, Agent, or Firm*—Conley Rose, P.C.

(57) ABSTRACT

A blocking device for mounting within a space defined within a hollow structure includes a holder and an expandable member. The holder is adapted to be mounted within the space. The expandable member is supported on the holder and is expandable by heat to form a foam member in order to block or substantially close the space. The holder includes a holder plate extending substantially perpendicular to the longitudinal axis of the space and supporting at least one side of the expandable member. The expandable member includes a constriction absorbing portion that is deformed so as to absorb potential constriction of the expandable member at the beginning of the expansion process of the expandable member.

20 Claims, 13 Drawing Sheets

U.S. PATENT DOCUMENTS

2005/0017542 A1* 1/2005 Belpaire .................. 296/187.01
2005/0082111 A1* 4/2005 Weber ........................ 181/204
2006/0272884 A1* 12/2006 Vilcek et al. ................. 181/198
2008/0111394 A1* 5/2008 Lewis ..................... 296/187.02

FOREIGN PATENT DOCUMENTS

JP          2004-1797038          6/2004

* cited by examiner

BLOCKING DEVICES FOR HOLLOW STRUCTURES

This application claims priority to Japanese patent application serial number 2004-179703, the contents of which are incorporated herein by reference.

BACKGROUND OF THE INVENTION

1. Field of the Invention

The present invention relates to blocking devices for hollow structures. In particular, the present invention relates to blocking devices for improving the damping and sound insulating properties of hollow panel structures, such as pillars, rocker panels, and roof side panels of automobile bodies. The hollow panel structures are each formed by a plurality of panels to have a closed cross-sectional area.

2. Description of the Related Art

A known blocking device has a holder mounted within a space defined within a hollow structure and an expandable member that is supported by the holder. The expandable member may be externally heated to expand so as to form a foam member. The holder includes a holder plate and a mounting device for mounting to the hollow structure. The holder plate is positioned within the space and extends substantially perpendicular to the longitudinal direction of the hollow structure. The holder plate typically supports at least one side of the expandable member.

In order to provide effective blocking, for example, Japanese Laid-Open Patent Publication No. 10-91170 teaches a blocking device having an annular portion formed on the entire expandable member or on at least a part of the expandable member. The blocking device also has an annular wall formed on a holder plate in order to support the inner peripheral surface of the annular portion of the expandable member.

However, in some cases, the expandable member of the above publication has a fragile region(s) at the annular portion or at a portion(s) having a narrow width. For example, in the event that the expandable member is molded by an injection molding process, a weld line may be produced at a portion where the flows of the molten material of the expandable member converge. Such a weld line may form a fragile region that tends to be easily torn.

Therefore, at the beginning of the external heating process of the formed extendable base member, the heated extendable base member may be torn at the fragile region (e.g. weld line) due to initial softening and constriction of the foam member before expansion of the foam member. When this occurs, a problem may be caused in which a gap is produced between the torn region and the inner peripheral wall of the space due to short charge of the material (i.e., an inadequate amount of material). As a result, the space may not be effectively blocked.

Even in the event that that expandable member is formed by a sheet punching process, the problem of non-effective blocking may still exist. The annular portion or the narrow width portion may form a fragile region that may be torn or broken before the expandable member is expanded.

SUMMARY OF THE INVENTION

It is accordingly an object of the present invention to teach blocking devices that can prevent or minimize accidental tearing or breakage of an expandable member due to the softening and constriction of the expandable member at the beginning of the expansion process.

In one aspect of the present teachings, blocking devices for mounting within spaces defined within hollow structures are taught. The blocking devices include a holder and an expandable member. The holder is adapted to be mounted within the space. The expandable member is supported on the holder and is expandable by heat so as to form a foam member in order to block (i.e., substantially close off) the space. The holder includes a holder plate extending substantially perpendicular to the longitudinal axis of the space and supporting at least one side of the expandable member. The expandable member includes a constriction absorbing portion that is deformed in order to absorb the potential constriction of the expandable member. The potential constriction is due to the heat applied to the expandable member at the beginning of the expansion process of the expandable member.

With this construction, the potential constriction of the expandable member at the beginning of the expansion process of the expandable member may be absorbed by the deformation, such as stretching, of the constriction absorbing portion. Therefore, the expandable member may expand to form a foam member without being torn or broken during the expansion process. As a result, the blocking device may reliably block the space within the hollow structure.

In one embodiment, the expandable member has a frame-like portion and is integrally molded by an injection molding process. The frame-like portion has a weld line serving as a fragile portion. The constriction absorbing portion includes at least one flexed portion molded integrally with the expandable member at the same time as the injection molding process.

Therefore, the expandable member may be reliably molded so as to have a desired configuration. At the same time, the flexed portion may be formed integrally with the expandable member. As a result, the productivity of the expandable member having a constriction absorbing portion can be improved.

In another embodiment, the flexed portion is positioned such that the weld line is included within the flexed portion or is positioned adjacent to the flexed portion. With this arrangement, the expandable member may further be reliably prevented from being torn at the weld line.

DETAILED DESCRIPTION OF THE INVENTION

Figure 1:
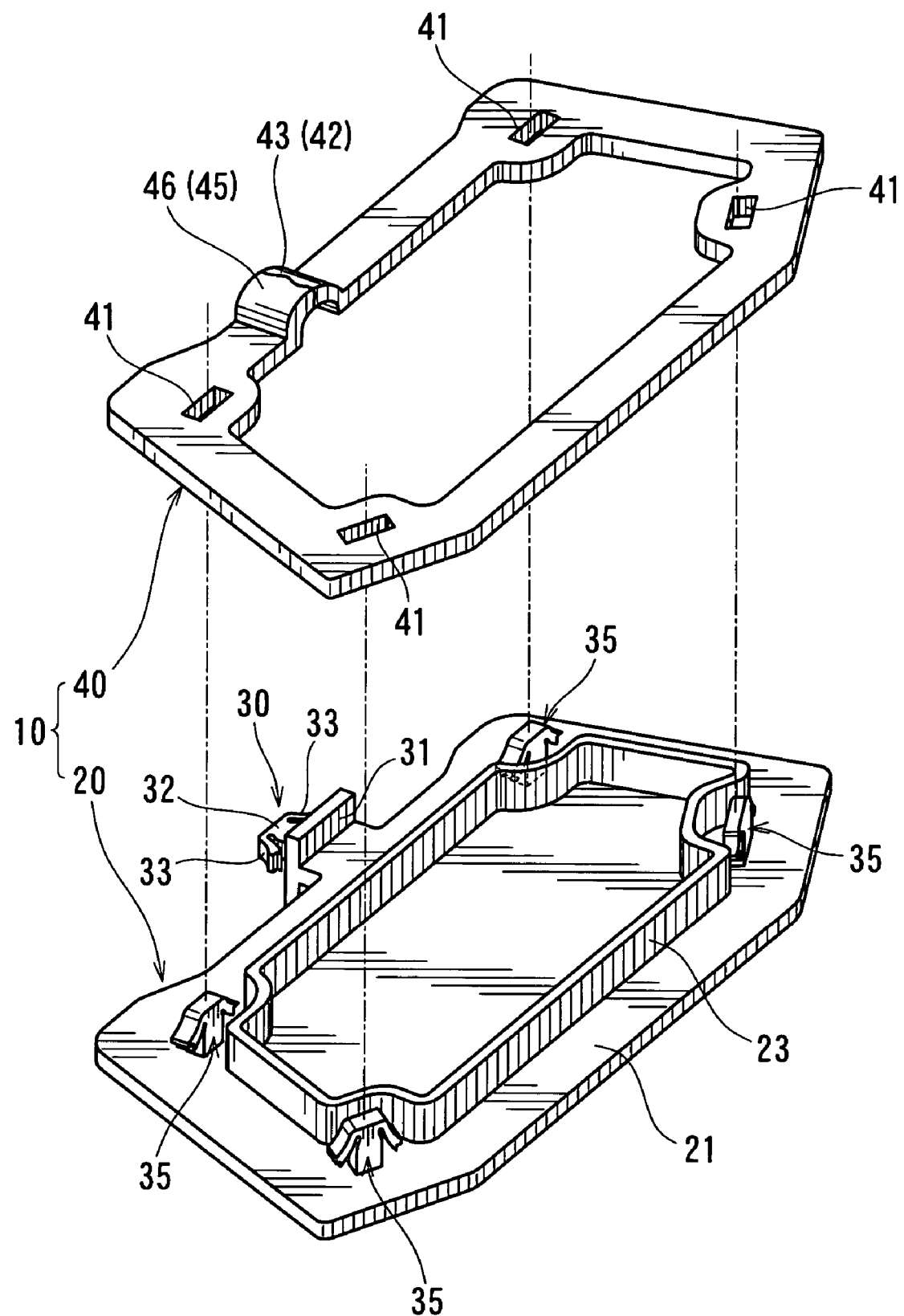
FIG. 1 is an exploded perspective view showing a holder and an expandable member of a blocking device for a hollow structure according to a first representative embodiment of the present invention.

Each of the additional features and teachings disclosed above and below may be utilized separately or in conjunction with other features and teachings to provide improved blocking devices for hollow structures and methods of manufacturing such blocking devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

First Representative Embodiment

A first representative embodiment will now be described with reference to FIGS. 1 to 9. Referring to FIG. 2, a hollow panel 1 has an inner panel 2 and an outer panel 4. The inner panel 2 and the outer panel 4 respectively have flanges 3 and 5 that are joined together by a spot-welding process to define a space 7, which has a closed cross-sectional area. For example, the hollow panel 1 may be a pillar, a rocker panel, or a roof-side panel of an automobile body. A non-circular mounting hole 6 is formed in the inner panel 2 at a predetermined position and extends throughout the thickness of the inner panel 2. A mounting clip 30 is fitted into the mounting hole 6 so as not to rotate relative thereto. For example, the mounting hole 6 may have an oval configuration, an elliptical configuration, or a rectangular configuration.

Figure 2:
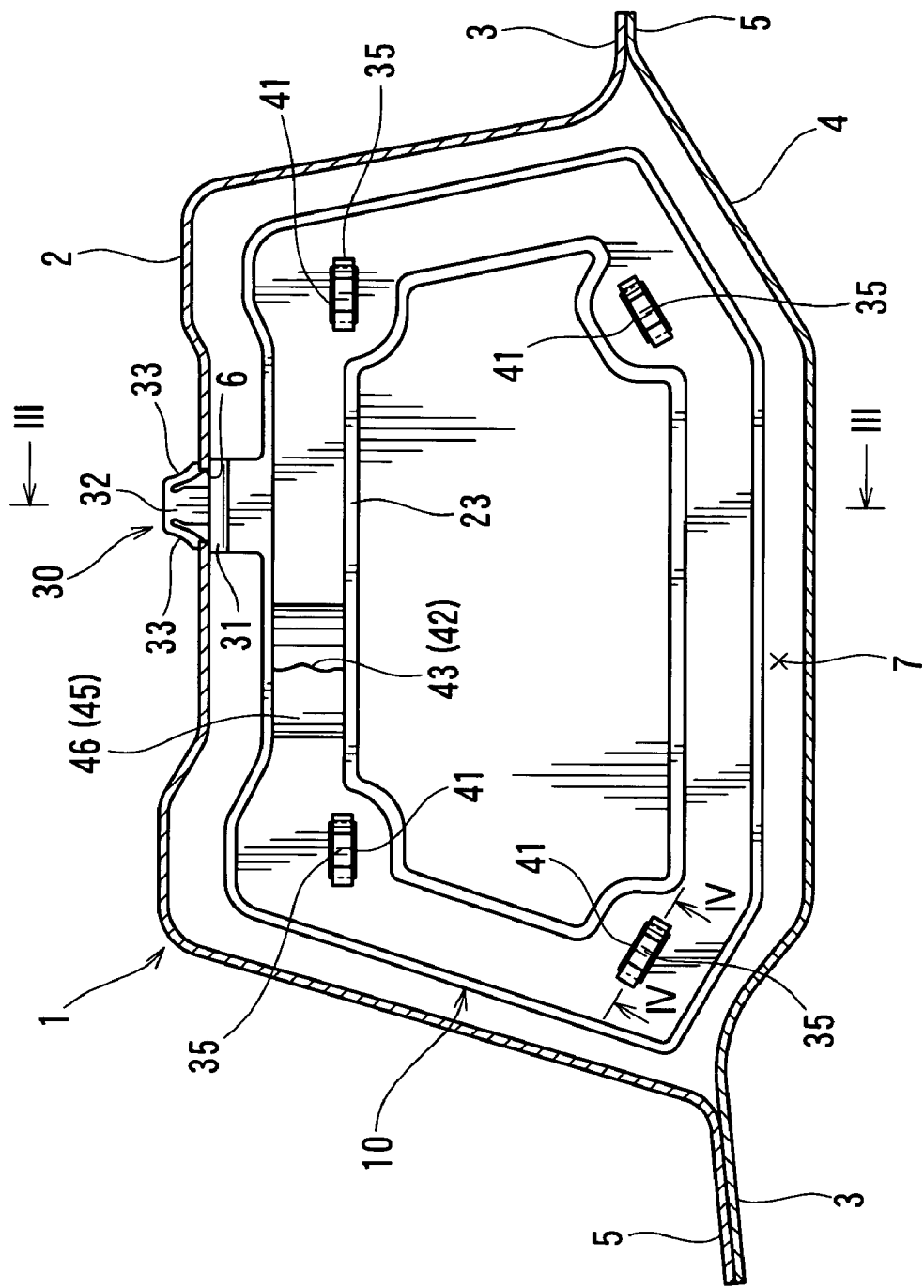
FIG. 2 is a cross-sectional view of the blocking device having the holder and the expandable member assembled together and showing the state where the blocking device is mounted within a space of the hollow structure.
Figure 3:
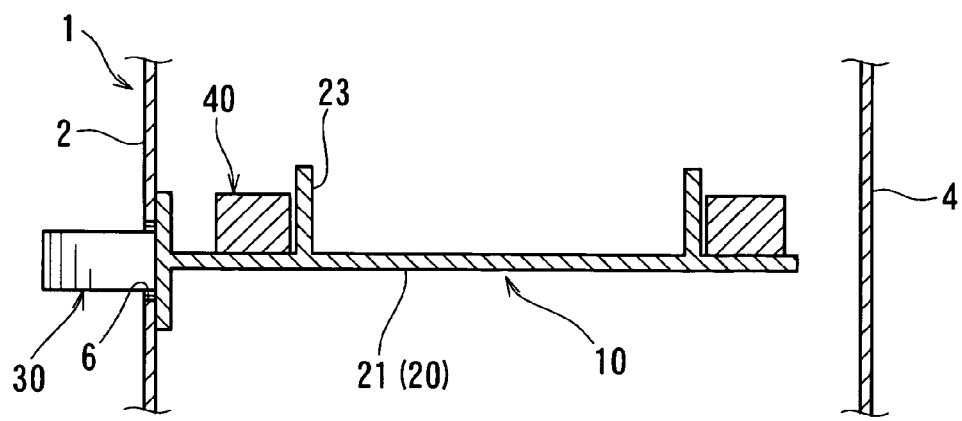
FIG. 3 is a cross-sectional view taken along line III-III in FIG. 2.
Figure 4:
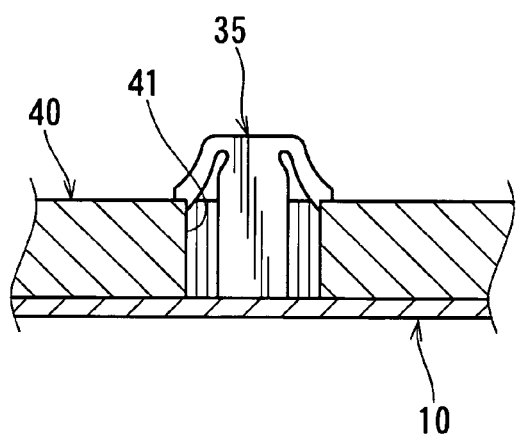
FIG. 4 is a partial cross-sectional view taken along line IV-IV in FIG. 2.

As shown in FIGS. 1 to 3, a representative blocking device 10 is disposed within the space 7 of the hollow panel 1 and includes a holder 20 and an expandable member 40. The holder 20 is mounted to the inner peripheral wall of the space 7. The expandable member 40 is supported by the holder 20 and may be expanded by heat to form a foam member in order to block at least a part of the space 7.

Preferably, the holder 20 is made of a heat resisting synthetic resin and may include the mounting clip 30, and a holder plate 21 extending substantially perpendicular to a longitudinal axis of the space 7 (i.e., the hollow panel 1). The holder plate 21 is adapted to support one side of the expandable member 40. The outer contour of the holder plate 21 may be substantially the same as the outer contour of the expandable member 40, or may be slightly larger or smaller than the same.

In order to support the inner peripheral surface of the expandable member 40, a circumferential wall 23 extends from one side of the inner peripheral edge of the holder plate 21 by a distance corresponding to the thickness of the expandable member 40 in the axial direction with respect to the longitudinal axis of the space 7. In the representative embodiment, the expandable member 40 has a frame-like configuration, so that each of the inner peripheral surface and the outer peripheral surface of the expandable member 40 extends continuously in the circumferential direction. In addition, the circumferential wall 23 is closed in a circumferential direction and may have a trapezoidal configuration. The inner peripheral surface of the expandable member 40 may also have a modified trapezoidal configuration conforming to the configuration of the circumferential wall 23. However, the circumferential wall 23 and the inner peripheral surface of the expandable member 40 may have any other configurations, such as a polygonal configuration other than trapezoidal configuration and a non-polygonal configuration including a circular configuration and an oblique configuration, for example.

In addition, on the same side as the circumferential wall 23, retainers 35 extend from the holder plate 21 and are positioned outwardly adjacent to the circumferential wall 23. The retainers 35 are adapted to engage and retain the expandable member 40.

The mounting clip 30 is formed integrally with the central portion of one side (i.e., the upper side as viewed in FIG. 2) of the outer periphery of the holder plate 21 and is positioned to correspond to the position of the mounting hole 6 of the inner panel 2. The mounting clip 30 has a base 31 extending from the central portion of one side of the outer periphery of the holder plate 21, a leg 32 extending from the base 31 upward (as viewed in FIG. 2) toward the mounting hole 6, and two resilient engaging portions 33 extending from the upper end of the leg 32 in a turn-back manner for resiliently engaging a peripheral portion of the mounting hole 6.

Preferably, the expandable member 40 may be made of synthetic resin containing an expanding agent mixed therewith. Consequently, the expandable member 40 may be expanded at a temperature between about 110° C. and 190° C. More preferably, the expandable member 40 may be chosen to also have a property of adhesion to metal. In addition, the expandable member 40 may have a flat-plate shaped configuration and may have a uniform thickness as long as it is appropriately sized to produce a clearance with the inner peripheral wall of the space 7 during installation. Further, other than the completely closed configuration shown in FIGS. 1 to 3, the expandable member 40 may be configured as opened at a part in the circumferential direction.

Engaging holes 41 are formed in the expandable member 40. Engaging holes 41 extend through the thickness of the expandable member 40 in order to engagingly receive the respective retainers 35 of the holder plate 21.

Figure 5:
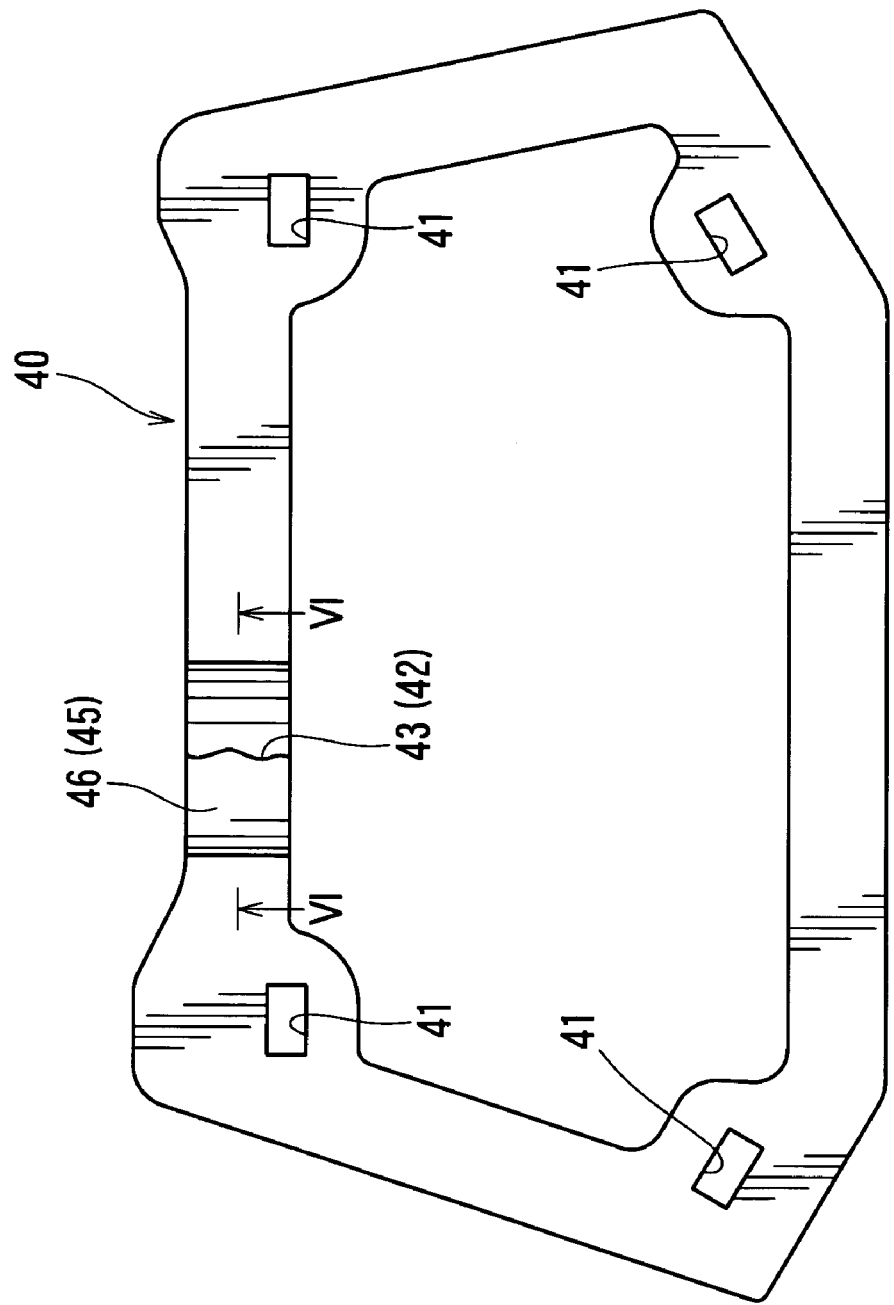
FIG. 5 is a front view of the expandable member.

As shown in FIGS. 1 and 5, the expandable member 40 may have a fragile portion 42 on a part along the circumferential length. In this connection, the expandable member 40 has a constriction absorption portion 45 that that may be deformed to absorb the initial constriction of the expandable member 40 at the beginning of the expanding process in order to prevent the expandable member 40 from being torn at the fragile portion 42. In this representative embodiment, the expandable member 40 is molded integrally by an injection molding process and may have a weld line 43 that constitutes the fragile portion 42. Thus, during the molding process of the expandable member 40, the flows of the molten material injected into a die cavity (not shown) via a gate (not shown) may converge at a position opposite to the gate. Consequently, the weld line 43 may be formed so as to extend from the inside to the outside of a part across the circumferential direction of the molded expandable member 40 (i.e., the weld line 43 may be formed across the width and thickness of one side of the frame shaped expandable member 40).

Figure 6:
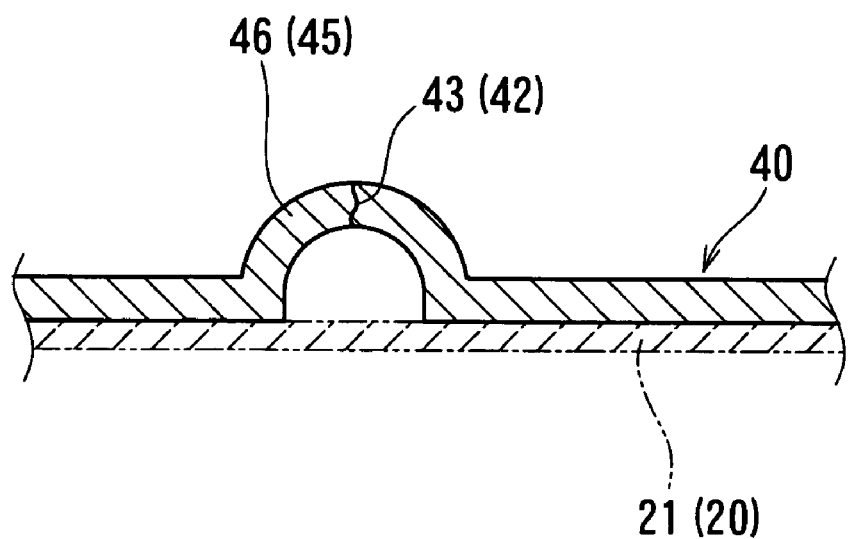
FIG. 6 is a partial cross-sectional view taken along line VI-VI in FIG. 5.

As shown in FIGS. 5 and 6, a flexed portion 46 is formed integrally with the expandable member 40 during the injection molding process and may serve as the constriction absorption portion 45. In this representative embodiment, the flexed portion 46 has a substantially arc-shaped configuration in a cross-section taken along a line extending in a circumferential length direction of the expandable member 40. The flexed portion 46 extends within a predetermined range along the circumferential length. The position of the flexed portion 46 is determined such that the weld line 43 is formed during the molding process of the expandable member 40 within the range of the flexed portion 46 or circumferentially adjacent to the flexed portion 46.

The operation of the above representative embodiment will now be described. First, the expandable member 40 is fitted onto the outer periphery of the circumferential wall 23 formed on the holder plate 21 of the holder 20. At the same time, the retainers 35 of the holder plate 21 are respectively inserted into the engaging holes 41 formed in the expandable member 40. In this way, the expandable member 40 is mounted on the holder 20 to form the blocking device 10. The blocking device 10 is then mounted within the space 7 of the hollow panel 1 as will be hereinafter described.

First, the mounting clip 30 of the holder plate 21 of the blocking device 10 is inserted into the mounting hole 6 of the inner panel 2 that forms a part of the hollow panel 1. A pair of the resilient engaging portions 33 engages the peripheral portion of the mounting hole 6. Therefore, the blocking device 10 may be mounted to the inner panel 2 so as to not rotate relative to the inner panel 2 due to the engagement of the resilient engaging portions 33 with the mounting hole 6. It should be noted that this step is performed before the inner panel 2 is joined to the outer panel 4 to form the hollow panel 1.

Thereafter, the inner panel 2, having the blocking device 10 mounted as described above, may be joined to the outer panel 4 by a spot welding process at opposing flanges 3 and 5. In this way, the hollow panel 1, having the blocking device 10 mounted within the space 7, having a closed cross-sectional area along a direction perpendicular to the longitudinal direction, may be completed as shown in FIG. 2.

Figure 8:
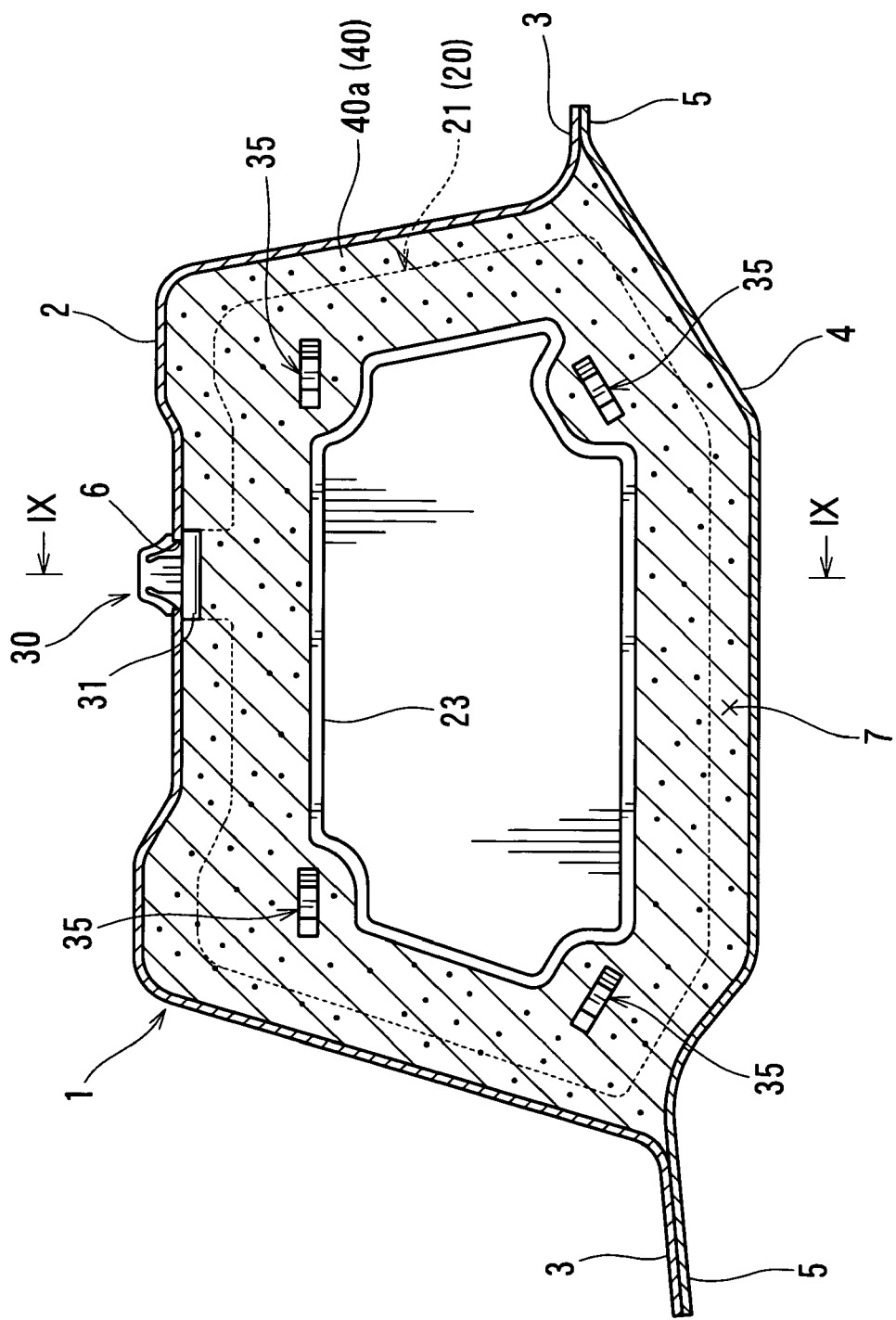
FIG. 8 is a cross-sectional view similar to FIG. 2 but showing the expanded state of the expandable member.
Figure 9:
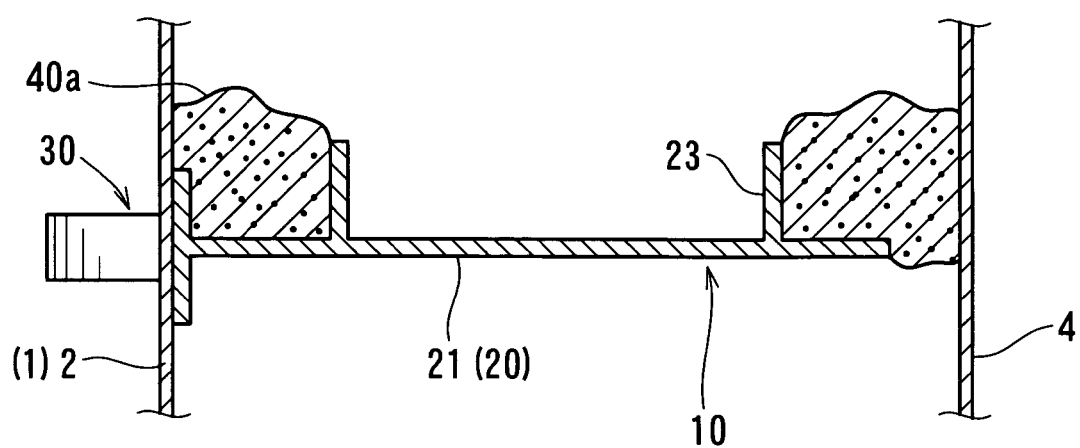
FIG. 9 is a cross-sectional view taken along line IX-IX in FIG. 8.

Subsequently, the blocking device 10 may be heated so that the expandable member 40 is expanded into the foam member 50 as shown in FIGS. 8 and 9. The heating process of the blocking device 10 may preferably be performed by utilizing the external heat that may be applied to the automobile body, having the hollow panel 1 mounted thereon, during the baking process after painting the automobile body.

Figure 7:
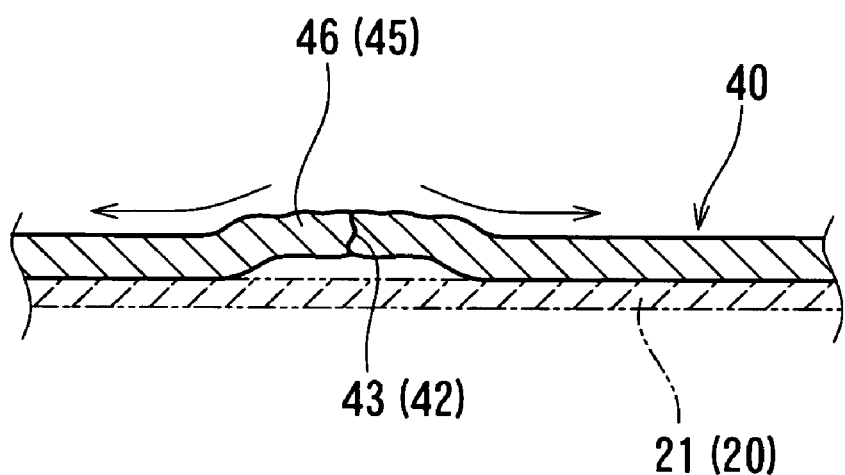
FIG. 7 is a partial cross-sectional view similar to FIG. 6 but showing the state where the constriction of the expandable base material of the blocking device is absorbed by the deformation of a constriction absorbing portion at the beginning of the expanding process of the expandable base material.

At the beginning of the heating process for expansion, the expandable member 40 may be softened and constricted. However, the flexed portion 46 may absorb the constriction of the expandable member 40 as the constriction absorption portion 45 formed on the expandable member 40, since the flexed portion 46 may be deformed so as to stretch as shown in FIG. 7. Therefore, the expandable member 40 may be prevented from being torn at the weld line 43. As a result, the expandable member 40 may appropriately uniformly expand towards the inner peripheral surface of the space 7 in order to produce a foam member 50 that has an outer peripheral surface closely contacting with the inner peripheral surface of the space 7, thereby effectively blocking the space 7.

In particular, according to the representative embodiment, the weld line 43, as the fragile portion 42 of the expandable member 40, is set to be positioned within the region of the flexed portion 46 or adjacent thereto. Therefore, the expandable member 40 is effectively prevented from being torn at the weld line 43.

Further, according to the representative embodiment, the flexed portion 46, as the constriction absorption portion 45, is formed integrally with the expandable member 40 by an injection molding process. Therefore, it is possible to accurately mold the expandable member 40 together with the flexed portion 46 in order to improve the productivity of the expandable member 40.

Second Representative Embodiment

A second representative embodiment will now be described with reference to FIGS. 10 and 11. The second representative embodiment is a modification of the first representative embodiment. Therefore, in FIGS. 10 and 11, like members are given the same reference numerals as in the first representative embodiment and the description of these members may not be repeated.

Figure 10:
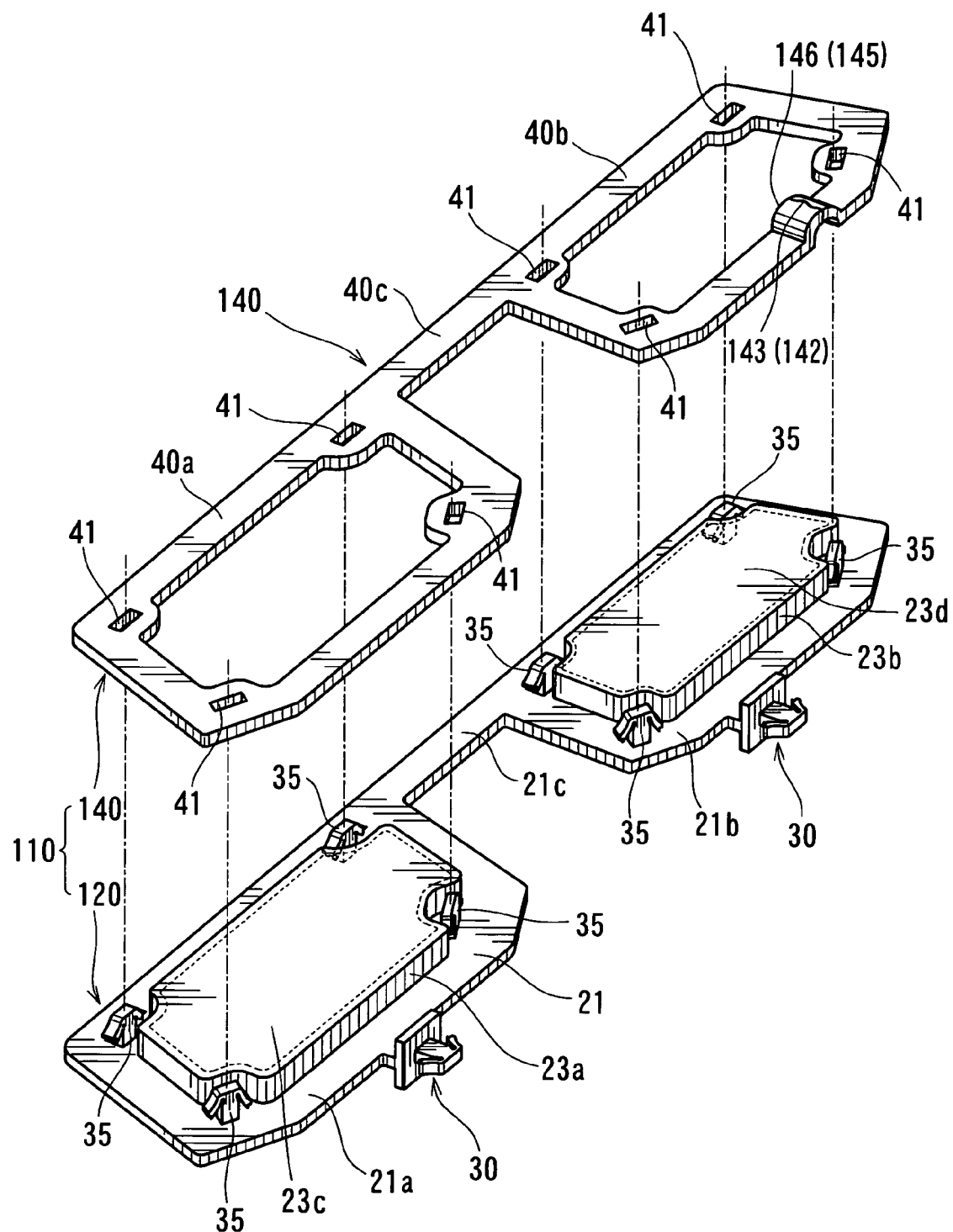
FIG. 10 is an exploded perspective view showing a holder and an expandable member of a blocking device for a hollow structure according to a second representative embodiment of the present invention.
Figure 11:
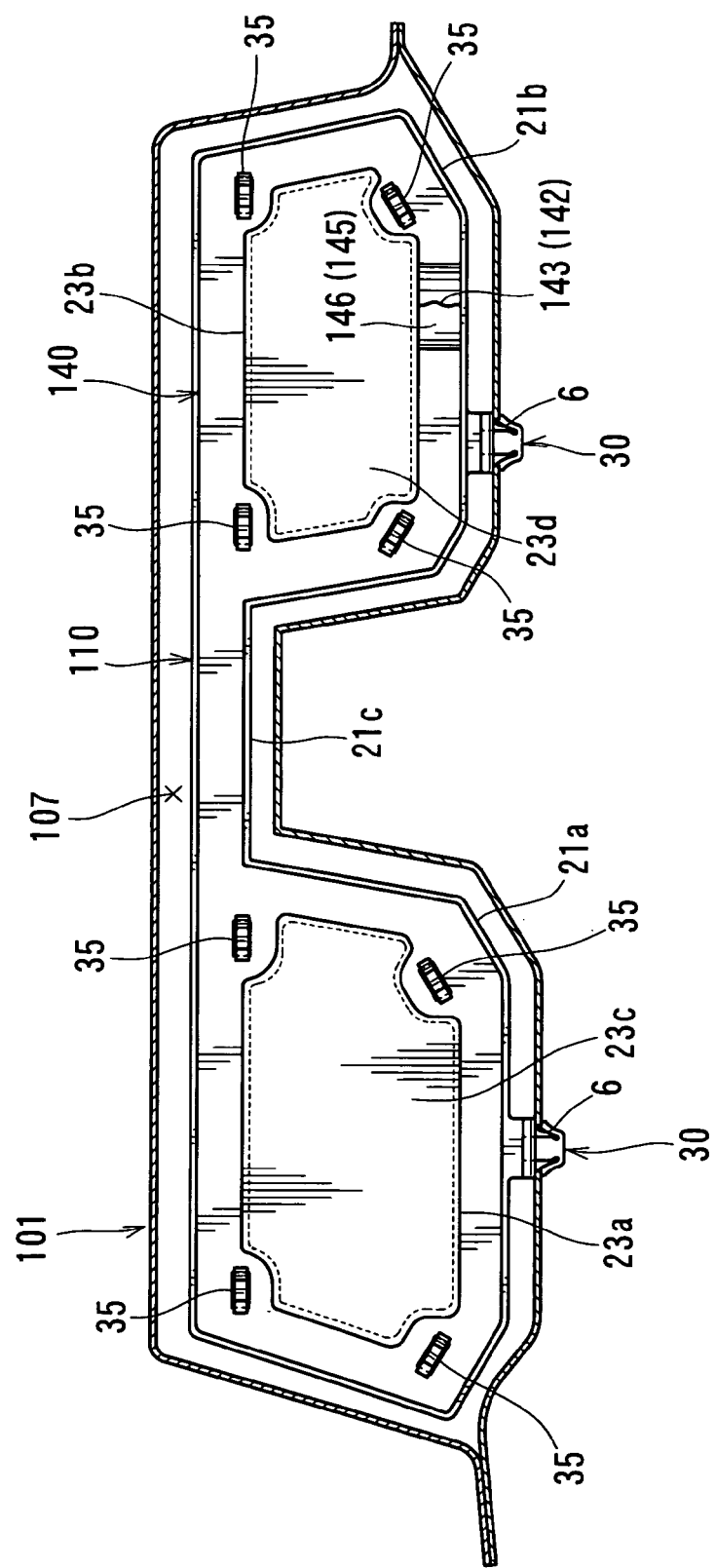
FIG. 11 is a cross-sectional view of the blocking device having the holder and the expandable member assembled together and showing the state where the blocking device is mounted within a space of the hollow structure.

Referring to FIGS. 10 and 11, a hollow panel 101 defines a space 107 having a substantially eyeglass-shaped configuration in cross-section. A blocking device 110 has a holder 120 and an expandable member 140. Similar to the first representative embodiment, the holder 120 is mounted within the space 107. In addition, the expandable member 140 is supported by the holder 120 and is expandable to form a foam member that blocks or substantially closes the space 107 when heated. Further, the holder 120 is made of heat resisting synthetic resin and includes the holder plate 21 and two mounting clips 30.

The holder plate 21 is configured to substantially conform to the cross-sectional configuration of the space 107 and has two circumferentially extending frame-shaped plate portions 21a and 21b and an elongated joint portion 21c connecting the plate portions 21a and 21b. A projection 23c is formed on one side of the plate portion 21a and defines a circumferential wall 23a that extends in the axial direction with respect to the longitudinal axis of the hollow panel 101 or the space 107. Similarly, a projection 23d is formed on one side of the plate portion 21b and defines a circumferential wall 23b that extends in the axial direction. The retainers 35 for engaging and retaining the expandable member 140 extend from one side of each of the plate portions 21a and 21b. In addition, a mounting clip 30 is formed integrally with a part (i.e., the lower part as viewed in FIG. 11) of the outer periphery of each of the plate portions 21a and 21b. Therefore, the holder 120 may be mounted to the hollow panel 101 through engagement of the mounting clips 30 with the mounting holes 6 formed in the lower panel portion of the hollow panel 101.

The expandable member 140 has two circumferentially extending frame-shaped portions 40a and 40b, and an elongated joint portion 40c formed integrally therewith. The elongated joint portion 40c connects the frame-shaped portions 40a and 40b. The frame-shaped portions 40a and 40b are adapted to be respectively fitted onto the outer peripheries of the circumferential walls 23a and 23b of the plate portions 21a and 21b. The engaging holes 41 are formed in the frame-shaped portions 40a and 40b for engagingly receiving the corresponding retainers 35 of the plate portions 21a and 21b of the holder plate 21.

In this representative embodiment, a fragile portion 142 is presented in a part of the frame-shaped portion 40b. A constriction absorption portion 145 is provided in this part of the frame-shaped portion 40b such that the fragile portion 142 is positioned within the region of the constriction absorption portion 145. The position of the fragile portion 142 is in order to prevent the fragile portion 142 from being torn due to constriction of the expandable member 140 at the beginning of the heating process or the expanding process. In this representative embodiment, the expandable member 140 may also be integrally molded by an injection molding process and may therefore have a weld line 143 that constitutes the fragile portion 142. As a result, during the molding process of the expandable member 140, the flows of the molten material injected into a die cavity (not shown) via a gate (not shown) may converge at a position opposite to the gate. The weld line 143 may be formed such that it extends from the inside to the outside of a section across the circumferential direction of the frame-shaped portion 40b of the molded expandable member 140.

Also in this representative embodiment, a flexed portion 146 may be formed integrally with the expandable member 140 during the injection molding process and may serve as the constriction absorption portion 145. The flexed portion 146 may have a substantially arc-shaped configuration in a cross-section taken along a line extending in the circumferential length direction of the frame-shaped portion 40b of the expandable member 140. The flexed portion 146 may extend within a predetermined range along the circumferential length. The position of the flexed portion 146 is determined such that the weld line 143 may be formed during the molding process of the expandable member 140 within the range of the flexed portion 146 or circumferentially adjacent to the flexed portion 146. In this connection, the gate of the die may be positioned on the side of the frame-shaped portion 40b. The other construction may be the same as in the first representative embodiment.

Therefore, at the beginning of the heating process for expansion, the expandable member 140 may be softened and constricted. However, the flexed portion 146 may absorb the constriction of the expandable member 140 as the constriction absorption portion 145 formed on the frame-shaped portion 140b of the expandable member 140, since the flexed portion 146 may be deformed so as to stretch. Therefore, the expandable member 140 may be prevented from being torn at the weld line 143. As a result, the expandable member 140 may appropriately uniformly expand toward the inner peripheral surface of the space 107 to produce a foam member (not shown) that has an outer peripheral surface closely contacting with the inner peripheral surface of the space 107, thereby effectively blocking the space 107.

Also in this representative embodiment, the weld line 143, as the fragile portion 142 of the expandable member 140, may be positioned within the region of the flexed portion 146 or adjacent thereto. Therefore, the expandable member 140 is effectively prevented from being torn at the weld line 143.

Further, the flexed portion 146, as the constriction prevention portion 145, is formed integrally with the frame-shaped portion 40b of the expandable member 140 via an injection molding process. Therefore, it is possible to accurately mold the expandable member 140 together with the flexed portion 146 in order to improve the productivity of the expandable member 140.

Figure 12:
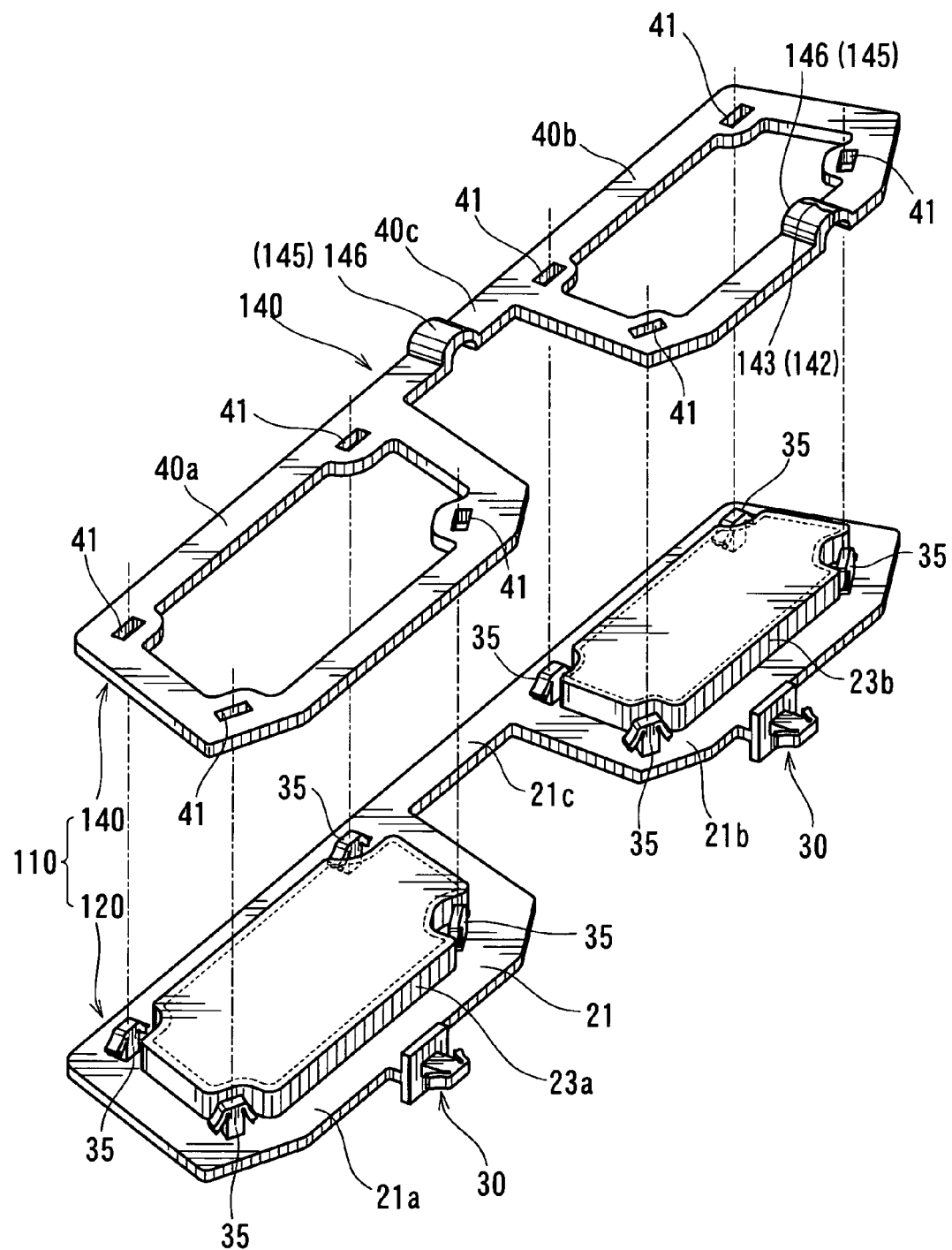
FIG. 12 is an exploded perspective view similar to FIG. 10 but showing an alternative embodiment having an additional flexed portion as a constriction absorbing portion formed on a joint portion of the expandable member.

In case of the second representative embodiment described above, the expandable member 140 has an elongated joint portion 40c connecting the frame-shaped portions 40a and 40b. Therefore, the possibility may exist that a fragile portion 142 may also be present at the joint portion 40c. In such a case, preferably an additional flexed portion 146, as a constriction absorbing portion 145, may also be formed on a part of the joint portion 40c, as shown in FIG. 12. With this arrangement, the flexed portion 146 of the joint portion 40c may also absorb the constriction of the expandable member 140 at the beginning of the heating process in order to prevent accidental tearing of the joint portion 40c.

Other Possible Embodiments

The present invention may not be limited to the first and second representative embodiments, but may be modified in various ways. Some of the various ways are further discussed below.

Figure 13:
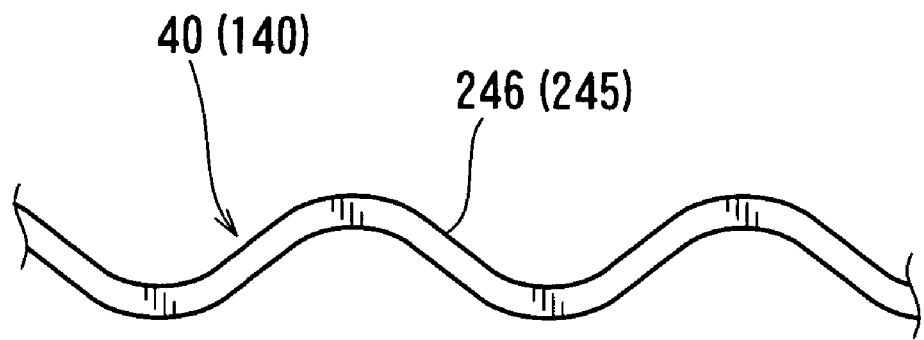
FIG. 13 is an alternative embodiment of the flexed portion where the flexed portion is configured in a waveform.
Figure 14:
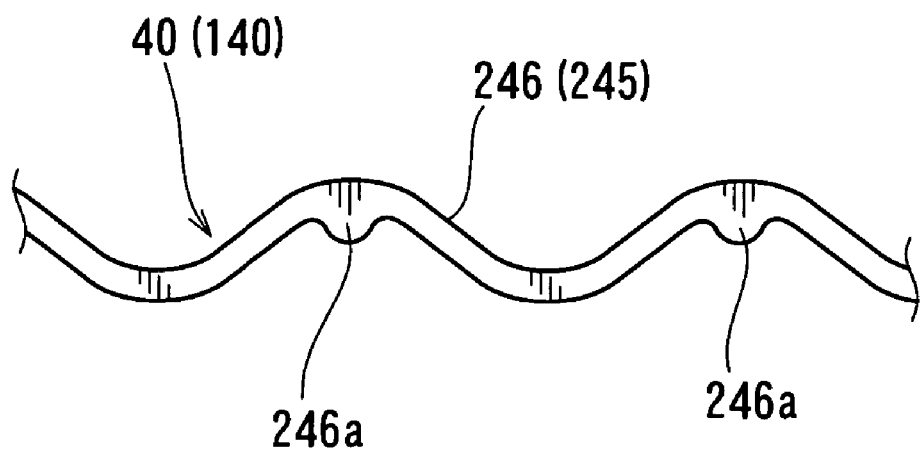
FIG. 14 is a modification of the flexed portion shown in FIG. 13 incorporating arc shaped projections extending from inside of the peak points of the waveform.

For example, although the flexed portion 46(146) of the expandable member 40(140) in the above embodiments has an arc-shaped cross-section, the flexed portion 46(146) may be replaced with a flexed portion 246 (i.e., a constriction absorbing portion 245) having a configuration similar to a waveform as shown in FIG. 13. In addition, the flexed portion 246 may be modified to have arc-shaped projections 246a extending inwardly (i.e., downwardly) from each peak point of the waveform, as shown in FIG. 14. This configuration is advantageous because the flexed portion 246 may be reliably prevented from being accidentally torn at the peak points of the waveform.

Figure 15:
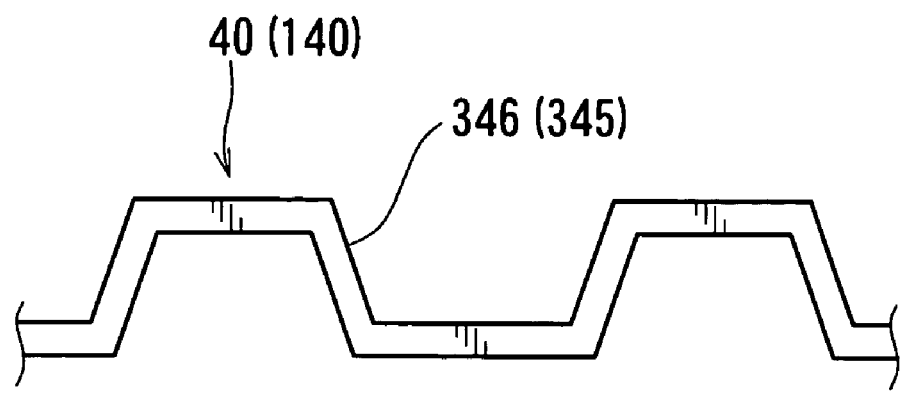
FIG. 15 is another alternative embodiment of the flexed portion configured by alternating trapezoidal convex and concave portions.
Figure 16:
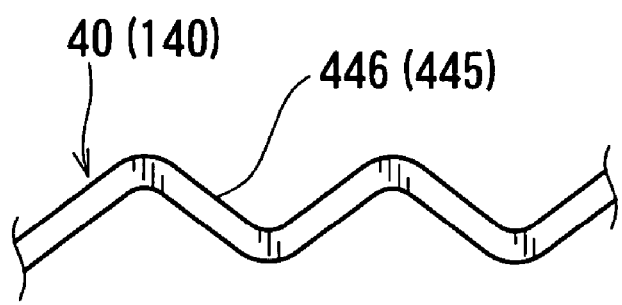
FIG. 16 is a further alternative embodiment of the flexed portion configured by alternating triangular convex and concave portions (zigzag configuration)

Alternatively, as shown in FIG. 15, the flexed portion 46(146) may be replaced with a flexed portion 346 (i.e., a constriction absorbing portion 345) configured as alternating trapezoidal convex and concave portions. Otherwise, as shown in FIG. 16, the flexed portion 46(146) may be replaced with a flexed portion 446 (i.e., a constriction absorbing portion 445) configured as alternating triangular convex and concave portions (i.e., a zigzag type of configuration).

Figure 17:
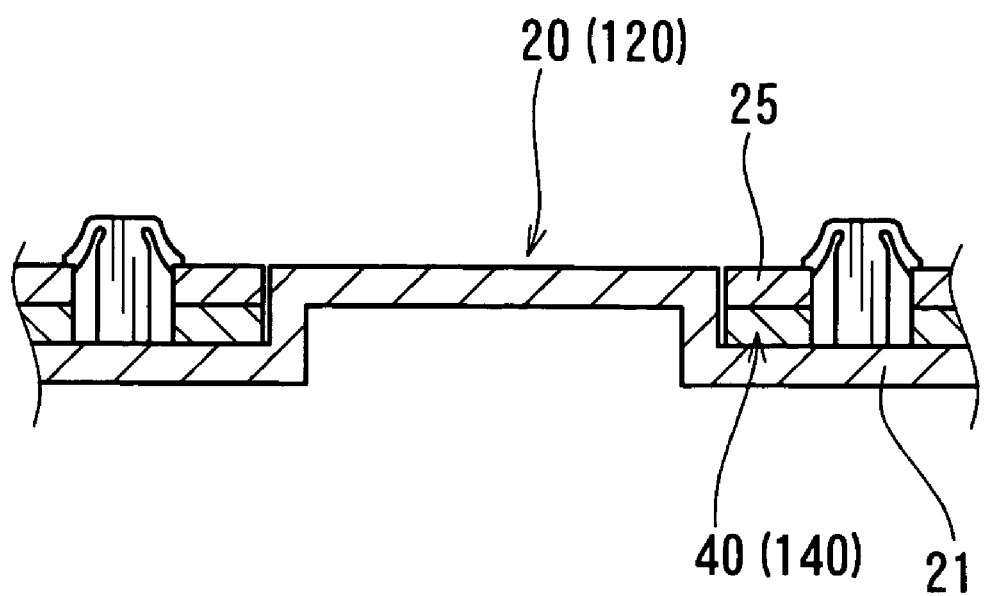
FIG. 17 is an alternative embodiment of the holder having two holder plates for clamping the expandable member therebetween.

Further, although the first and second representative embodiments have been described in connection with the construction in which the holder 20(120) has a single holder plate 21, the present invention also may be applied to a construction in which the holder plate 20 (120) has a second holder plate 25 in addition to the holder plate 21 and corresponding mounting clips in order to clamp the expandable member 40(140) between the holder plates 21 and 25 as shown in FIG. 17. In this connection, the holder plate 25 may have a cutout portion (not shown) in a location opposing the flexed portion 46(146) (i.e., the constriction absorbing portion 45(145)) of the expandable member 40(140). Additionally, the holder plates 21 and 25 may be joined to each other via a hinge or may be coupled together via a clip or the like.

Furthermore, although the expandable members 40 and 140 of the first and second representative embodiments are formed via an injection molding process, the expandable members 40 and 140 may also be formed by punching sheets of expandable material that have been previously molded by an extrusion molding process. In such a case, the fragile portion 42(142) may be the narrow width portion(s) in the punched expandable member. In this connection, the flexed portion 46 (146) as the constriction absorbing portion 45(145) may be formed such that the narrow width portion is within the region of the flexed portion or adjacent to the flexed portion. Therefore, the expandable member may be prevented from being torn at the fragile portion in the same manner as in the first and second representative embodiments.

Still further, although the above representative embodiments have been described in connection with the hollow panels 1 and 101, which may be pillars, rocker panels, or roof side panels of automobile bodies, the present invention also may be applied to any other hollow structures such as those in houses, buildings, boats, and ships.

This invention claims:

1. A blocking device for mounting within a space defined within a hollow structure and having a longitudinal axis, comprising:
    a holder arranged and constructed to be mounted within the space; and
    an expandable member supported on the holder and expandable by heat so as to form a foam member in order to block the space;
    wherein the holder comprises a holder plate extending substantially perpendicular to the longitudinal axis of the space and supporting at least one side of the expandable member; and
    wherein the expandable member includes a constriction absorbing portion arranged and constructed to be deformed in order to absorb potential constriction of the expandable member at a beginning of an expansion processing of the expandable member.

2. The blocking device as in claim 1,
    wherein the expandable member comprises a frame-shaped portion and is integrally molded by an injection molding process; and
    wherein the frame-shaped portion has a weld line serving as a fragile portion; and
    wherein the constriction absorbing portion comprises at least one flexed portion molded integrally with the expandable member.

3. The blocking device as in claim 2,
    wherein the flexed portion is positioned such that the weld line is included in the flexed portion or is positioned adjacent to the flexed portion.

4. A blocking device for mounting within a space defined within a hollow structure, comprising:
    an expandable member disposed within the space of the hollow structure and expandable to block at least a portion of the space when heated;
    wherein the expandable member has an outer peripheral surface configured to closely contact with an inner circumferential wall of the space when the expandable member has expanded, and
    wherein the expandable member includes a constriction absorbing portion arranged and constructed to absorb potential constriction of the expandable member due to an application of heat.

5. The blocking device as in claim 4, wherein the constriction absorbing portion is formed integrally with the expandable member.

6. The blocking device as in claim 5, wherein the expandable member including the constriction absorbing portion is molded by an injection molding process.

7. The blocking device as in claim 6, wherein the expandable member is made of resin containing an expanding agent.

8. The blocking device as in claim 5,
    wherein the expandable member comprises at least one frame-shaped portion having a circumferential length and a width substantially perpendicular to the circumferential length; and
    wherein the constriction absorbing portion is provided in the at least one frame-shaped portion and positioned at a part along the circumferential length of the frame-shaped portion.

9. The blocking device as in claim 8,
    wherein the expandable member comprises a plurality of frame-shaped portions and at least one joint portion connecting the frame-shaped portions, and
    wherein the constriction absorbing portion is also provided at a part along the length of the at least one joint portion.

10. The blocking device as in claim 5, wherein the constriction absorbing portion comprises a surplus portion of the expandable member.

11. The blocking device as in claim 10,
    wherein the expandable member has a flat plate-shaped configuration and extends substantially within a plane, and
    wherein the surplus portion is configured as a flexed portion protruding from the plane of the expandable member.

12. The blocking device as in claim 11,
    wherein the flexed portion is configured such that the flexed portion is pulled in tension when the expandable member is constricted by heat.

13. The blocking device as in claim 4, wherein the constriction absorbing portion is positioned such that a potential fragile portion of the expandable member is positioned within or adjacent to the constriction absorbing portion.

14. The blocking device as in claim 13, wherein the potential fragile portion is a weld line formed during a molding process of the expandable member.

15. The blocking device as in claim 4, further comprising a holder arranged and constructed to support the expandable member against the inner circumferential wall of the space of the hollow structure after expansion of the expandable member.

16. The blocking device as in claim 15, further comprising a second holder arranged and constructed to bound at least a portion of the expandable member between the holder and the second holder.

17. A blocking device for mounting within a space defined within a hollow structure, comprising:
    an expandable member disposed within the space of the hollow structure and expandable to block at least a portion of the space when heated; and
    a holder arranged and constructed to support at least a part of the expandable member within the space of the hollow structure;
    wherein the expandable member has an outer peripheral surface configured to closely contact with an inner circumferential wall of the space after expansion of the expandable member, and
    wherein the expandable member comprises a constriction absorbing portion arranged and constructed to absorb potential constriction of the expandable member due to an operation of expanding the expandable member.

18. The blocking device as in claim 17, wherein the expandable member is made of resin containing an expanding agent.

19. The blocking device as in claim 17, wherein the constriction absorbing portion is positioned such that a potential fragile portion of the expandable member is positioned proximate to the constriction absorbing portion.

20. The blocking device as in claim 17, wherein the constriction absorbing portion comprises a series of repeating shaped configurations.

* * * * *